United States Patent
Brown et al.

(10) Patent No.: US 7,430,609 B2
(45) Date of Patent: Sep. 30, 2008

(54) MANAGING ACCESS TO STREAMS HOSTED ON DUPLICATING SWITCHES

(75) Inventors: Scott K. Brown, Sterling, VA (US); Thomas Pepper, Boulder Creek, CA (US); David Biderman, San Francisco, CA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 608 days.

(21) Appl. No.: 10/134,552

(22) Filed: Apr. 30, 2002

(65) Prior Publication Data

US 2002/0161900 A1 Oct. 31, 2002

Related U.S. Application Data

(63) Continuation-in-part of application No. 09/893,692, filed on Jun. 29, 2001.

(60) Provisional application No. 60/286,964, filed on Apr. 30, 2001.

(51) Int. Cl.
*G06F 15/16* (2006.01)

(52) U.S. Cl. .................. 709/231; 709/208; 709/217; 709/219; 709/222; 709/229; 709/227; 709/238; 709/248

(58) Field of Classification Search .......... 709/231, 709/230, 232, 203, 217, 226; 725/86; 370/216, 370/217, 218
See application file for complete search history.

(56) References Cited

U.S. PATENT DOCUMENTS

| | | | |
|---|---|---|---|
| 5,682,597 A * | 10/1997 | Ganek et al. ......... | 455/3.04 |
| 5,774,660 A | 6/1998 | Brendel et al. | |
| 5,778,187 A | 7/1998 | Monteiro et al. | |
| 5,799,002 A | 8/1998 | Krishman | |
| 5,802,301 A * | 9/1998 | Dan et al. ......... | 709/223 |
| 5,935,245 A | 8/1999 | Sherer | |
| 5,946,614 A | 8/1999 | Robins et al. | |
| 5,973,722 A | 10/1999 | Wakai et al. | |
| 5,983,005 A | 11/1999 | Monteiro et al. | |
| 6,011,782 A | 1/2000 | DeSimone et al. | |
| 6,052,805 A | 4/2000 | Chen et al. | |
| 6,061,349 A | 5/2000 | Coile et al. | |
| 6,061,504 A * | 5/2000 | Tzelnic et al. ......... | 709/219 |
| 6,097,720 A | 8/2000 | Araujo et al. | |

(Continued)

FOREIGN PATENT DOCUMENTS

JP 08-320800 12/1996

(Continued)

OTHER PUBLICATIONS

International Search Report dated Jul. 2, 2003 (Appln. No. PCT/US03/12086).

(Continued)

*Primary Examiner*—Bunjob Jaroenchonwanit
*Assistant Examiner*—Dohm Chankong
(74) *Attorney, Agent, or Firm*—Fish & Richardson P.C.

(57) ABSTRACT

A source accessed by a terminal may be changed by enabling a terminal to access a stream of data units on a first duplicating switch, determining that the terminal should access the stream from a second duplicating switch, and transitioning the terminal to the second duplicating switch to access the stream.

23 Claims, 11 Drawing Sheets

U.S. PATENT DOCUMENTS

| | | | |
|---|---|---|---|
| 6,115,752 A | 9/2000 | Chauhan | |
| 6,119,163 A | 9/2000 | Monteiro et al. | |
| 6,141,336 A | 10/2000 | Bauchot et al. | |
| 6,157,635 A | 12/2000 | Wang et al. | |
| 6,266,335 B1 | 7/2001 | Bhaskaran | |
| 6,327,622 B1 | 12/2001 | Jindal et al. | |
| 6,363,075 B1 | 3/2002 | Huang et al. | |
| 6,370,112 B1 * | 4/2002 | Voelker | 370/218 |
| 6,377,996 B1 * | 4/2002 | Lumelsky et al. | 709/231 |
| 6,415,312 B1 | 7/2002 | Boivie | |
| 6,415,323 B1 | 7/2002 | McCanne et al. | |
| 6,434,622 B1 | 8/2002 | Monteiro et al. | |
| 6,490,285 B2 | 12/2002 | Lee et al. | |
| 6,510,553 B1 * | 1/2003 | Hazra | 725/87 |
| 6,516,350 B1 * | 2/2003 | Lumelsky et al. | 709/226 |
| 6,910,078 B1 * | 6/2005 | Raman et al. | 709/231 |
| 7,054,949 B2 * | 5/2006 | Jennings | 709/238 |
| 7,072,972 B2 * | 7/2006 | Chin et al. | 709/231 |
| 7,299,291 B1 * | 11/2007 | Shaw | 709/231 |
| 2001/0044851 A1 * | 11/2001 | Rothman et al. | 709/231 |
| 2002/0065922 A1 | 5/2002 | Shastri | 709/227 |
| 2002/0112069 A1 | 8/2002 | Sim | |
| 2002/0116532 A1 | 8/2002 | Berg | |
| 2004/0025186 A1 * | 2/2004 | Jennings et al. | 725/93 |

FOREIGN PATENT DOCUMENTS

| | | |
|---|---|---|
| JP | 11-232201 | 8/1999 |
| JP | 11-261580 | 9/1999 |
| JP | 2000-010895 | 1/2000 |
| JP | 2000-029813 | 1/2000 |
| JP | 2000-172618 | 6/2000 |
| JP | 2001-508258 | 6/2001 |
| WO | WO 98/31107 | 7/1998 |
| WO | WO 00/28713 | 5/2000 |

OTHER PUBLICATIONS

International Preliminary Examination Report (IPER), dated Jun. 30, 2003, Appln. No. PCT/US02/13363.

Oh-ishi, Tetsuya, et al., "Contents Delivery Function over Managed Network," *IEICE Technical Report*, vol. 101, No. 120, Jun. 14, 2001.

Keller et al., An Active Router Architecture for Multicast Video Distribution, St. Louis, Missouri, 2005.

Lockwood et al., Reprogrammable Network Packet Processing on the Field Programmable Port Extender (FPX), 2001, St. Louis, Missouri.

Taylor et al., Dynamic Hardware Plugins (DHP): Exploiting Reconfigurable Hardware for High-Performance Programmable Routers, 2002, St. Louis, Missouri.

Choi et al., Design of a Flexible Open Platform for High Performance Active Networks, 1999, St. Louis, Missouri.

* cited by examiner

MANAGING ACCESS TO STREAMS HOSTED ON DUPLICATING SWITCHES

CROSS-REFERENCE TO RELATED APPLICATIONS

This application claims priority from U.S. Provisional Application No. 60/286,964, titled "Generating Multiple Data Streams from a Single Data Source" and filed Apr. 30, 2001, and this application is a continuation-in-part application of U.S. application Ser. No. 09/893,692, titled "Generating Multiple Data Streams from a Single Data Source" and filed Jun. 29, 2001, both of which are incorporated by reference.

TECHNICAL FIELD

This invention relates to streaming media.

BACKGROUND

The widespread availability of communications networks, such as the Internet, has enabled new applications that use this communications capability. An application that becomes successful can quickly gain exposure to countless users, requiring new resources to meet the increased demand. One such application is streaming media that enables access to audio, video and other media.

SUMMARY

In one general aspect, a stream source accessed by a terminal may be changed by enabling a terminal to access a stream of data units from a first duplicating switch, determining that the terminal should access the stream from a second duplicating switch, and enabling the terminal to access the stream from the second duplicating switch.

Implementations may include one or more of the following features. For example, the second duplicating switch may transmit the stream upon determining that the terminal should access the stream from the second duplicating switch. Determining that the terminal should access the stream from the second duplicating switch may include determining that enabling the terminal to access the second duplicating switch will consume less bandwidth than having the terminal access the first duplicating switch. The terminal may be disabled from accessing the stream of data units from the first duplicating switch.

In another general aspect, managing access to streams on duplicating switches may be accomplished by receiving a request from a terminal to receive a stream of data units, identifying a duplicating switch to host the stream, and enabling the identified duplicating switch to transmit the stream to the terminal.

Receiving the request may include receiving the request on a stream manager or on a duplicating switch. The stream of data units may be one of a video stream, an audio stream, an image stream, or a text stream. The duplicating switch may receive the stream of data units after receiving the request for the stream from the terminal, after identifying the duplicating switch, or after enabling the duplicating switch to transmit the stream of data units.

The identity of the duplicating switch may be transmitted to the terminal. The duplicating switch may receive the stream after the identity of the duplicating switch has been transmitted to the terminal. The identity of the duplicating switch may be transmitted from a duplicating switch already transmitting the stream, or from a stream manager.

Identifying the duplicating switch may include identifying a duplicating switch closest to the terminal. Identifying the duplicating switch closest to the terminal may include identifying a duplicating switch with the lowest latency between the duplicating switch and the terminal, with a fewest number of links between the duplicating switch and the terminal, with the most bandwidth between the duplicating switch and the terminal, with the most available bandwidth between the duplicating switch and the terminal, closest geographically, based on a status of a link between a stream source and the terminal, based on a status of a link between the duplicating switch and the terminal, or based on a status of a link between the duplicating switch and a stream source. Identifying the duplicating switch may include identifying a duplicating switch capable of hosting an additional stream.

Enabling the duplicating switch to host the stream of data units may include authenticating the hosting of the stream on the duplicating switch. Enabling the duplicating switch may include transmitting the stream to the duplicating switch or forwarding a list of terminals that are stream recipients to the duplicating switch.

Enabling the duplicating switch may include enabling the duplicating switch to receive the stream, duplicate content portions of the stream, and transmit the content of portions to the terminal.

A terminal already receiving the stream may receive the stream from the identified duplicating switch. Enabling the terminal already receiving the stream to receive the stream from the identified duplicating switch may include ceasing transmission of the stream from a duplicating switch that previously was transmitting the stream.

In another general sense, a source accessed by a terminal may be changed from a first duplicating switch to a second duplicating switch by receiving a first stream of data units from a first duplicating switch, determining that the terminal should receive a second stream of data units from a second duplicating switch during the transmission of the first stream to the terminal, transitioning to the second stream of data units in response to the determination, and synchronizing the first and second streams.

Reception of the first stream may be ceased. For example, the reception may be ceased in response to receiving a cease message. Determining that the terminal should receive the second stream from the second duplicating switch may include determining that transitioning the terminal to the second duplicating switch would consume less bandwidth, or that the second duplicating switch would decrease resources required by the terminal.

Determining that the terminal should transition may include determining that the first duplicating switch will experience a loss of service, that a network between the terminal and the second duplicating switch has more bandwidth, more available bandwidth, less latency, better quality of service characteristics, or better time variation characteristics.

Synchronizing the first and second streams may include determining that content received in the first stream and the second stream is temporally related. The content may be identical. The content of the first stream and the second stream may be temporally related such that the terminal may use the second stream in place of the first stream without a user of the terminal perceiving the transition. Synchronizing the first and second streams may include using a buffer.

Reception of the first stream may be ceased when it is determined that content in the buffer temporally overlaps content in the second stream. Content in the buffer may be provided by the first or second streams.

Other features and advantages will be apparent from the description and drawings, and from the claims.

DESCRIPTION OF DRAWINGS

Like reference symbols in the various drawings indicate like elements.

DETAILED DESCRIPTION

For illustrative purposes, FIGS. 1-11 describe a communications system for implementing techniques for allocating duplicating switch resources. Generally, a terminal requests a stream of data units. In response, a duplicating switch capable of transmitting the stream to the terminal is identified. The identified duplicating switch is then enabled to transmit the stream to the terminal. For instance, the duplicating switch may receive the stream, store content from the stream, and transmit the stream to the terminal. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
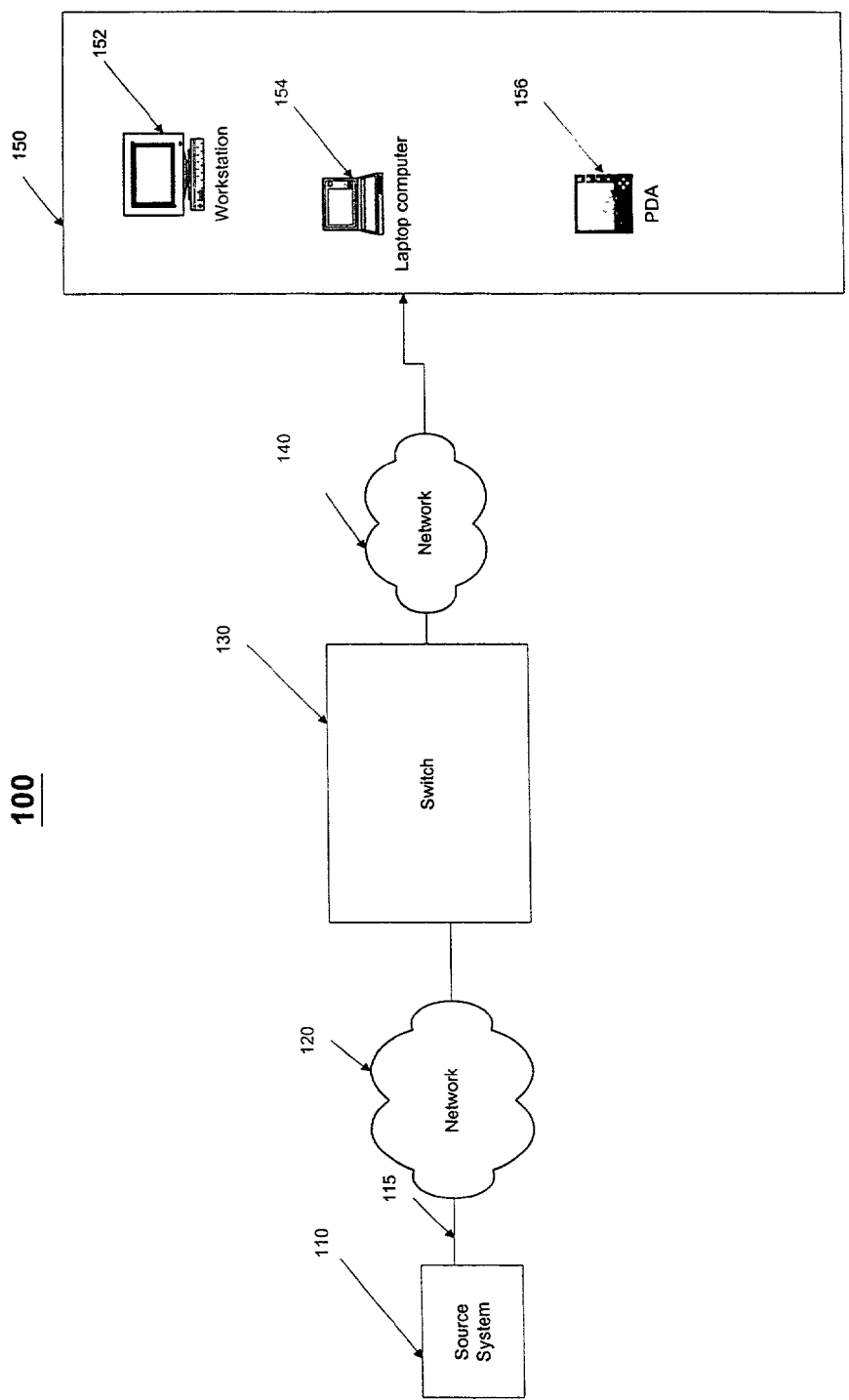
FIG. 1 is a block diagram of a communications system capable of using a duplicating switch to generate multiple streams of data units from a single source.

Referring to FIG. 1, communications system 100 may be structured and arranged with a source system 110, two or more terminals 150, and communication software and hardware enabling communications between the source system 110 and the terminals 150. More particularly, the communications system 100 typically includes the source system 110, a network 120, a duplicating switch 130, a network 140 and terminals 150. As will be described in greater detail, the source system 110 generally transmits one or more data units in a stream of data units across network 120 to one or more switches 130 that duplicate data units or portions thereof and transmit the duplicated data units or data unit portions to two or more terminals 150 through network 140.

Typically, a source system 110 may be structured and arranged to convert a media source (e.g., a video or audio feed) into data units for transmission across a network 120. The source system 10 may include a general-purpose computer having a central processor unit (CPU), and memory/storage devices that store data and various programs such as an operating system and one or more application programs. Other examples of a source system 110 include a workstation, a server, a special purpose device or component, a broadcast system, other equipment, or some combination thereof capable of responding to and executing instructions in a defined manner. The source system 110 also typically includes an input/output (I/O) device (e.g., video and audio input and conversion capability), and peripheral equipment such as a communications card or device (e.g., a modem or a network adapter) for exchanging data with the network 120.

A communications link 115 is used to communicate data between source system 110 and network 120. Communications link 115 may include, for example, a telephone line, a wireless network link, a cable network, or a direct connection.

The network 120 typically includes hardware and/or software capable of enabling direct or indirect communications between the sending system 110 and the switch 130. The network 120 may include a direct link between the source system 110 and the switch 130, or it may include one or networks or subnetworks between them (not explicitly shown). Each network or subnetwork may include, for example, a wired or wireless data pathway capable of carrying and receiving data. Examples of network 120 include the Internet, the World Wide Web, a WAN ("Wide Area Network"), a LAN ("Local Area Networks"), an analog or a digital wired and/or wireless telephone network (e.g., PSTN ("Public Switched Telephone Network"), ISDN ("Integrated Services Digital Network"), or xDSL ("any form of Digital Subscriber Loop")), a radio, television, cable, or satellite network, or any other delivery mechanism for carrying data.

The duplicating switch 130 typically is structured and arranged to receive the stream of data units from the source system 110, to duplicate the stream of data units, and to transmit a stream of duplicated data units to one or more terminals 150. In some implementations, the duplicating switch 130 is structured and arranged to perform filtering and forwarding between different domains at the same level of the protocol stack in the OSI ("Open System Interconnection") reference model. For example, switch 130 may forward Ethernet frames between different Ethernet segments. In another example, switch 130 may forward IP packets between different IP subnets.

In general, duplicating switch 130 includes a device that performs network operations and functions in hardware (e.g., in a chip or part of chip). In some implementations, the device may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating switch 130 may include using a Field Programmable Gate Array (FPGA). A FPGA is generally defined as including a chip or chips fabricated to allow a third party designer to implement a variety of logical designs on the chip. For example, a third party designer may load a design within a FPGA to replace the received IP addresses with different IP addresses, or may load a design within the FPGA to segment and reassemble IP packets as they are modified while being transmitted through different networks.

Implementations of the device included in the duplicating switch 130 may include a network processor. A network processor is generally defined to include a chip or chips for allowing software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that maintains which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

Data units handled by duplicating switch 130 may be accessed by or sent to terminals 150 through network 140. As such, network 140 is structured and arranged to receive data units transmitted from the duplicating switch 130 for transmission to the terminals 150.

The network 140 may include hardware and/or software capable of enabling direct or indirect communications between the duplicating switch 130 and the terminal 150. As such, the network 140 may include a direct link between the duplicating switch 130 and the terminal 150, or it may include one or more networks or subnetworks between them (not shown). Each network or subnetwork may include, for example, a wired or wireless data pathway capable of carrying and receiving data. Examples of the delivery network include the examples noted above with respect to network 120. Network 120 and network 140 may share one or more hardware or software devices.

The terminal 150 may include one or more devices capable of receiving the stream of data units transmitted by duplicating switch 130 through network 140. The terminal 150 may include a controller (not shown) that processes instructions received from or generated by a software application, a program, a piece of code, a device, a computer, a computer system, or a combination thereof, which independently or collectively direct operations of the terminal 150. The instructions may be embodied permanently or temporarily in any type of machine, component, equipment, storage medium, or propagated signal that is capable of being delivered to the terminal 150 or that may reside with the controller at terminal 150. Terminal 150 may include a general-purpose computer (e.g., a personal computer) capable of responding to and executing instructions in a defined manner, a workstation 152, a notebook computer 154, a PDA ("Personal Digital Assistant") 156, a wireless phone, a component, other equipment, or some combination of these items that is capable of responding to and executing instructions.

In one implementation, the terminal 150 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, terminal 150 may include a wireless telephone running a micro-browser application on a reduced operating system with general purpose and specialized hardware capable of operating in mobile environments.

Figure 2:
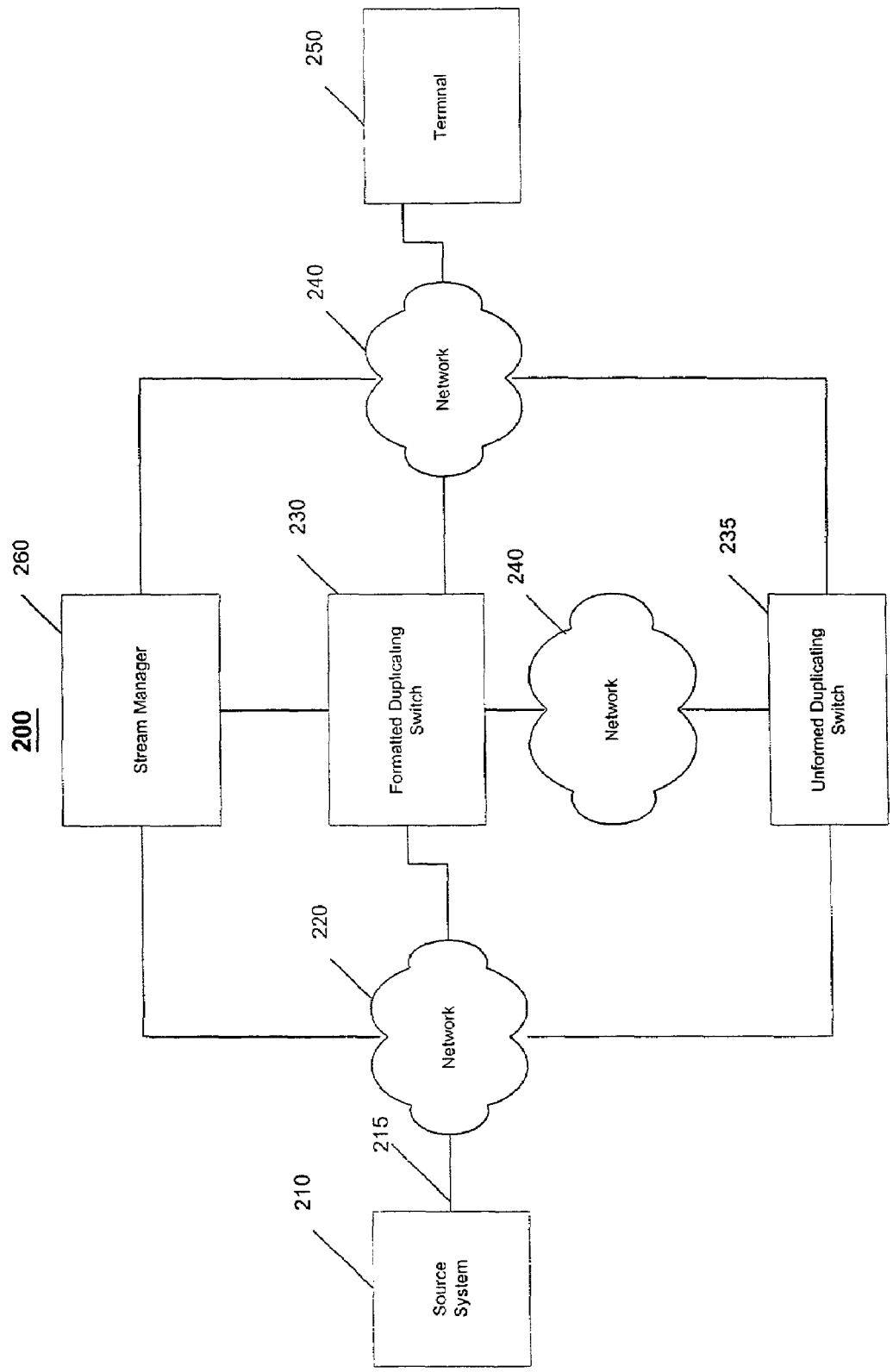
FIG. 2 is a block diagram of a communications system with a stream manager structured and arranged to refer a terminal to an unformatted duplicating switch to access a stream.

Referring to FIG. 2, a communications system 200 typically includes a source system 210, a communications link 215, a network 220, a formatted duplicating switch 230, an unformatted duplicating switch 235, a network 240, a terminal 250, and a stream manager 260. The system 200 may be structured and arranged to enable the stream manager 260 to refer the terminal 250 to the unformatted duplicating switch 235 to access a stream. In particular, as shown, the terminal 250 may communicate with the stream manager 260 to request a stream of data units, and the stream manager then may provide the identity of a duplicating switch capable of hosting the stream of data units.

In general, aspects of the communications system 200 may resemble aspects of the communications system described with respect to FIG. 1. For example, the source system 210, the communications link 215, the network 220, the formatted duplicating switch 230, the network 240, and the terminal 250 may correspond, respectively, to the source system 110, the communications link 115, the network 120, the duplicating switch 130, the network 140, and the terminal 150. FIG. 2 describes an aspect of the communications system 200, focusing primarily on the capability of a terminal 250 to interface with a stream manager 260 to identify a duplicating switch that enables the terminal 250 to access a stream.

The source system 210 includes a device that transmits a stream of data units to a duplicating switch (e.g., formatted duplicating switch 230 or unformatted duplicating switch 235) for distribution.

The network 220 includes a network capable of enabling communications between the source system 210, the stream manager 260, the formatted duplicating switch 230, and the unformatted duplicating switch 235.

The formatted duplicating switch 230 is a duplicating switch structured and arranged to receive a stream, duplicate content in the stream, and transmit the stream to two or more terminals. The duplicating switch is described as formatted because the duplicating switch is already hosting the stream when the stream manager 260 receives a request from a terminal to receive the stream (e.g., the formatted duplicating switch 230 is already hosting and transmitting the stream to other terminals).

The unformatted duplicating switch 235 is similar to the formatted duplicating switch 230. In contrast to the formatted duplicating switch 230, the unformatted duplicating switch 235 is in a state in which it is not receiving and/or hosting the stream prior to a state change that indicates that the unformatted duplicating switch 235 should host a stream for the terminal 250. In one implementation, the state change may occur when the stream manager 260 identifies the unformatted duplicating switch 235 as being a duplicating switch to host the stream. In another implementation, the state change occurs when the stream manager 260 receives a request from a terminal that is not receiving the stream.

The network 240 is generally capable of enabling communications between the stream manager 260, the formatted duplicating switch 230, the unformatted duplicating switch 235, and the terminal 250. Implementations of the network 240 may include links and/or devices in common with network 220. Implementations also may include separate networks between the devices in communications system 200. For example, a terminal 250 may communicate with stream manager 260 across one link while communicating with the unformatted duplicating switch 235 across another link.

The terminal 250 is generally capable of communicating with other devices in the communications system 200 through network 240. For example, in one implementation, the terminal 250 communicates with the stream manager 260 to access a stream of data units.

The stream manager 260 may include one or more devices structured and arranged to enable the terminal 250 to contact a duplicating switch (e.g., formatted duplicating switch 230 or unformatted duplicating switch 235) to access a stream. The stream manager 260 may include a controller (not shown) that processes instructions received from or generated by a software application, a program, a piece of code, a device, a computer, a computer system, or a combination thereof, to direct operations of the stream manager 260. The instructions may be embodied permanently or temporarily in any type of machine, component, equipment, storage medium, or propagated signal that is capable of being delivered to the stream manager 260 or that may reside with the controller at the stream manager 260. The stream manager 260 may include a general-purpose computer (e.g., a personal computer) capable of responding to and executing instructions in a defined manner, a system, a component in a duplicating switch, other equipment, or some combination of these items that is capable of responding to and executing instructions.

In one implementation, the stream manager 260 includes one or more management and authentication applications structured and arranged to identify an unformatted duplicating switch. These management and authentication applications may run on a general-purpose operating system and a hardware platform that includes a general-purpose processor and specialized hardware for graphics, communications, and/or other capabilities. In another implementation, the stream manager 260 may include a switch identifier (e.g., a server or program) that manages from which duplicating switches the terminals access the stream. For example, the stream manager 260 may be structured and arranged to communicate to the terminals which specific duplicating switch will host the streams (e.g., duplicate and transmit the streams of data units), as well as being enabled to communicate to the identified switch the information and authorization required to host streaming the required stream.

Implementations of the stream manager 260 may include having a service provider or a content provider operate the stream manager 260. For example, a service provider may offer streaming services. In another example, a formatted duplicating switch 230 also may act as a stream manager 260.

Figure 3:
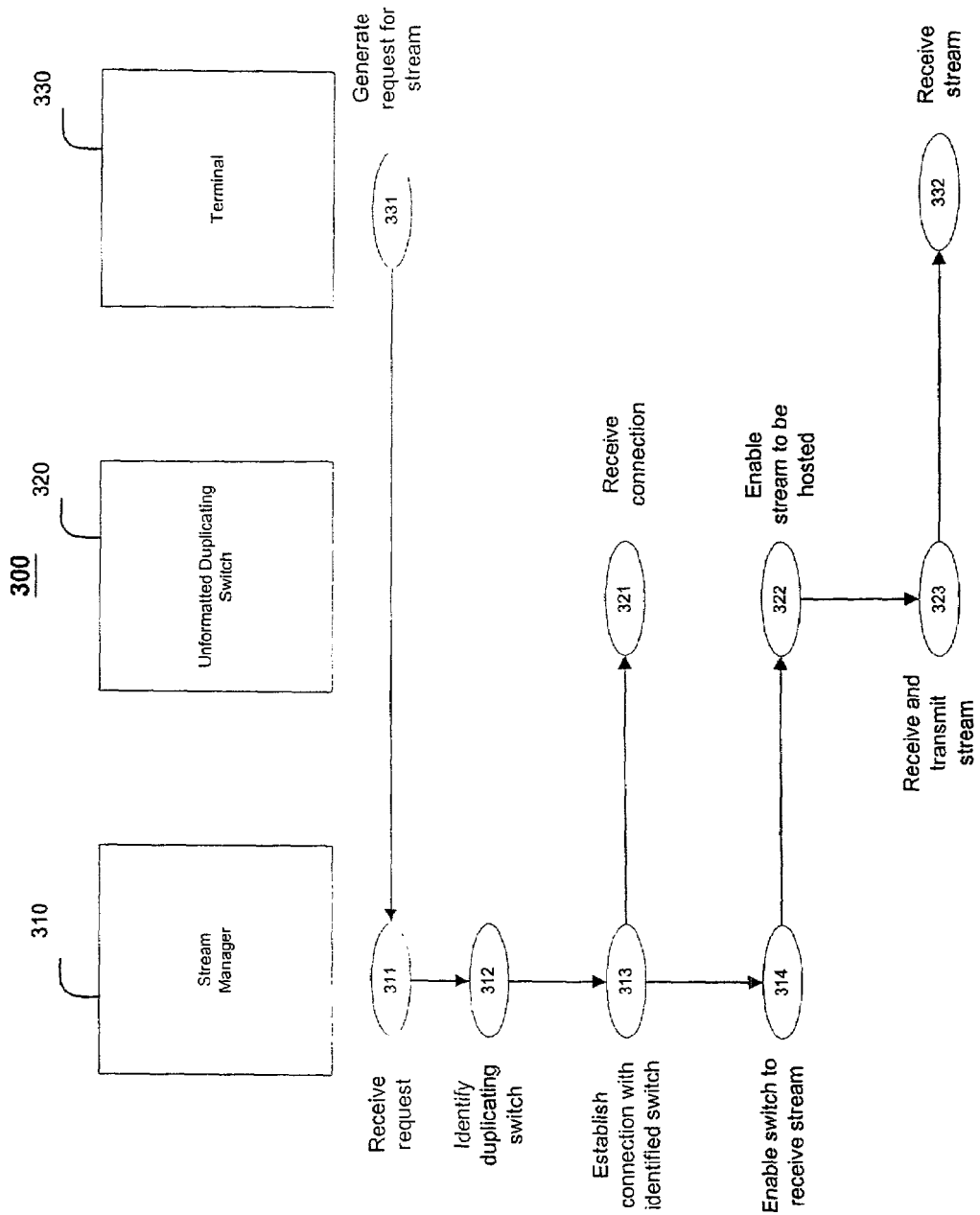
FIG. 3 is a flow diagram showing a stream manager enabling an unformatted duplicating switch to host a stream of data units.

FIG. 3 illustrates having a stream manager enable an unformatted duplicating switch to host a stream of data units. Communications system 300 includes a stream manager 310, an unformatted duplicating switch 320, and a terminal 330. Generally, aspects of the stream manager 310 correspond to aspects of the stream manager 260 in FIG. 2, aspects of the unformatted duplicating switch 320 correspond to aspects of unformatted duplicating switch 235 in FIG. 2, and aspects of the terminal 330 correspond to aspects of the terminals 150 and 250 in FIGS. 1 and 2.

Initially, terminal 330 generates a request for the stream (step 331). The stream manager 310 receives the request (step 311) and identifies a duplicating switch (step 312). Typically, identifying a duplicating switch includes finding one or more duplicating switches that are able to receive a stream, duplicate content in the stream, and transmit the content to a terminal. Implementations may include initially determining that several duplicating switches are available and identifying one duplicating switch based on specified priorities. For example, a duplicating switch may identify all duplicating switches that have available capacity, and then identify the duplicating switch with the fewest "hops" between the terminal and the duplicating switch. Implementations also may include identifying the duplicating switch using an iterative prioritization system that includes several sets of filters.

Identifying the duplicating switch also may include identifying both formatted and unformatted duplicating switches. For example, the stream manager 310 may determine that a formatted duplicating switch (e.g., a duplicating switch already hosting the requested stream) is best able to support the terminal.

Stream manager 310 establishes a connection with the duplicating switch (step 313). Establishing the connection with the duplicating switch may include establishing a communications channel so that the stream manager 310 and the unformatted duplicating switch 320 may communicate. Implementations may include having the stream manager 310 establish the communications channel in advance. For example, a stream manager 310 may periodically poll the duplicating switch to receive status information.

Unformatted duplicating switch 320 receives the connection (step 321). Implementations of receiving the connection may include a handshake process that validates and verifies establishment of the communications channel. For example, the unformatted duplicating switch 320 may wait for an acknowledgement that the stream manager received the connection establishment.

Implementations of receiving the connection may include using stateless protocols (e.g., UDP ("User Datagram Protocol")) to establish a communications channel. For example, the stream manager 310 and the unformatted duplicating switch 320 may communicate switch and stream information using UDP.

Stream manager 310 enables the unformatted duplicating switch 320 to receive the stream (step 314). Typically, this involves enabling the duplicating switch to duplicate the content in the stream and to transmit the content to two or more terminals. Enabling the duplicating switch to receive the stream may include directing a stream source or another duplicating switch already receiving the stream to transmit the stream to the unformatted duplicating switch 320. Enabling the unformatted duplicating switch 320 to transmit the stream may include enabling the duplicating switch to maintain a list of recipients that receive the stream. The list of recipients may be actively managed as terminals request the stream and/or request to stop receiving the stream.

Enabling the switch also may include using an authentication sequence. For example, the stream manager 310 may challenge the unformatted duplicating switch 320 to verify its identity. Similarly, the unformatted duplicating switch 320 may challenge the stream manager 310. The authentication sequence also may include communicating security information. For example, the stream manager 310 may transmit a list of terminals authorized to receive a specified stream. In another example, the stream manager 310 may perform a key exchange to enable the stream to be encrypted.

Other implementations of the authentication sequence may include exchanging billing information. For example, a stream manager 310 may communicate with an unformatted duplicating switch 320 owned and operated by a different organization. The operator of the stream manager 310 may pay the operator of the unformatted duplicating switch 320 based on the bandwidth consumed or the number of connections supported by the unformatted duplicating switch 320.

Unformatted duplicating switch 320 enables the stream to be hosted (step 322). When enabled, unformatted duplicating switch 320 receives and transmits the stream (step 323). Terminal 330 receives the stream (step 332).

Figure 4:
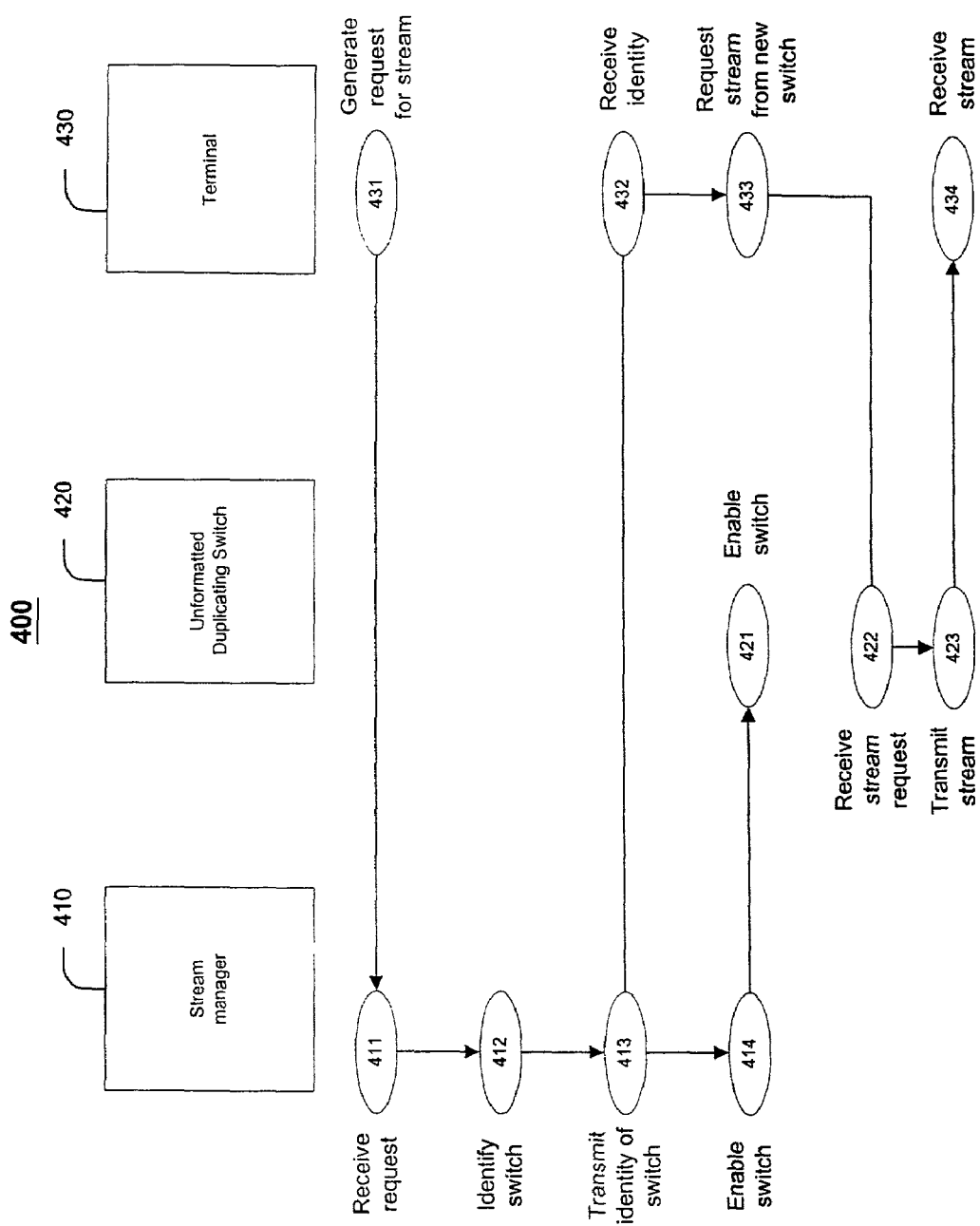
FIG. 4 is a flow diagram showing a stream manager interfacing with a terminal to identify an unformatted duplicating switch to access a stream.

FIG. 4 illustrates having a stream manager enable an unformatted duplicating switch to host a stream of data units. In particular, FIG. 4 illustrates having a terminal interface with a stream manager to receive the identity of a duplicating switch and request the stream from the identified duplicating switch. Communications system 400 includes a stream manager 410, an unformatted duplicating switch 420, and a terminal 430. In general, aspects of the stream manager 410 correspond to aspects of stream manager 260 in FIG. 2 aspects of the unformatted duplicating switch 420 correspond to aspects of unformatted duplicating switch 235 in FIG. 2 and aspects of the terminal 430 correspond to aspects of terminal 150 and 250 in FIGS. 1 and 2.

Initially, terminal 430 generates a request for the stream (step 431). Stream manager 410 receives the request (step 411) and identifies a duplicating switch (step 412). Stream manager 410 transmits the identity of the duplicating switch (step 413) and enables the identified duplicating switch to host the stream of data units (steps 414, 421). Terminal 430 receives the identity (step 432) and requests the stream from the unformatted duplicating switch (step 433). Unformatted duplicating switch 420 receives the request (step 422) and transmits the stream to the terminal 430 (step 423), which then receives the stream (step 434).

Figure 5:
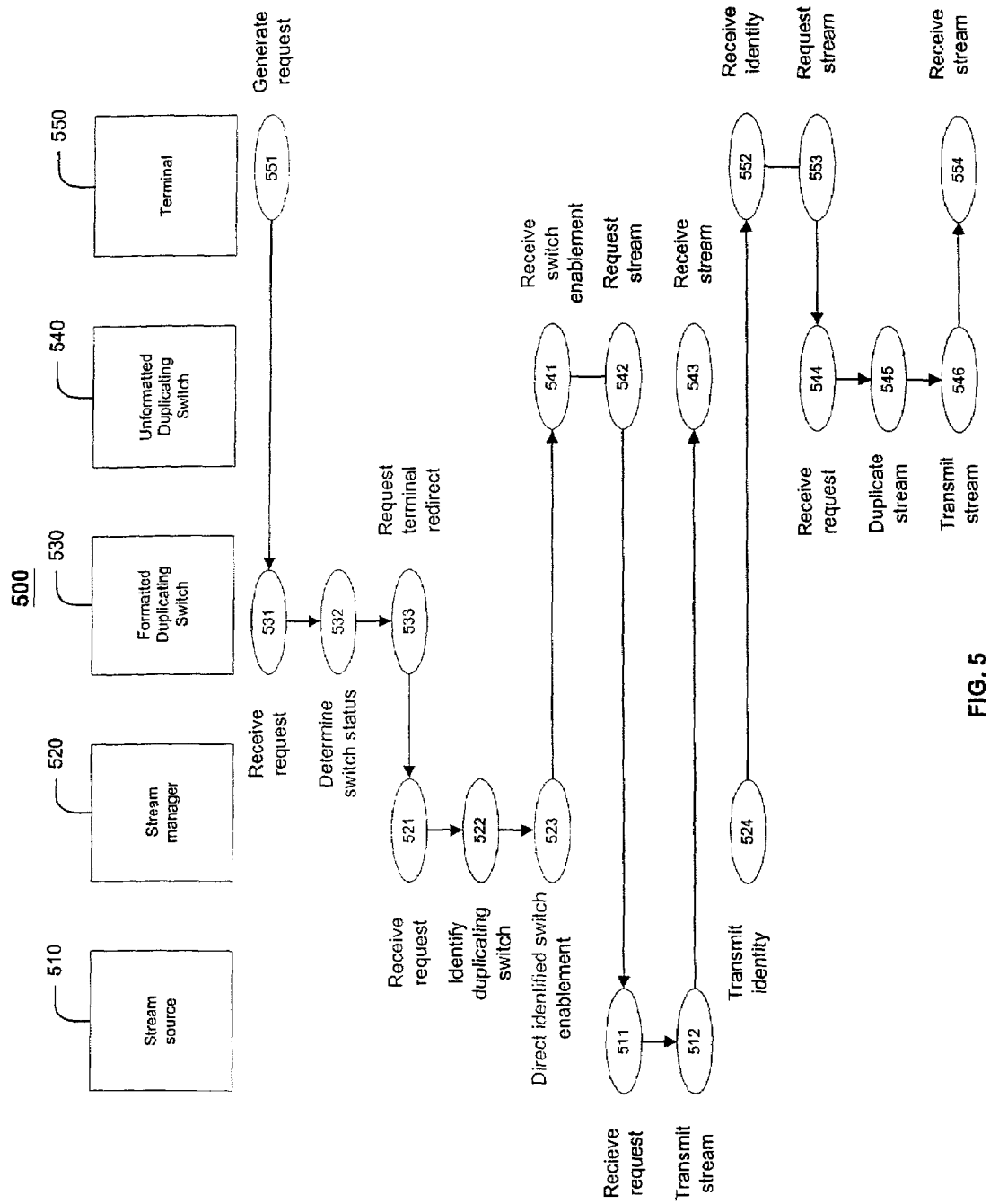
FIG. 5 is a flow diagram showing a terminal being transferred from a formatted duplicating switch to an unformatted duplicating switch.

FIG. 5 illustrates a method of transitioning a terminal from a formatted duplicating switch to an unformatted duplicating switch. In particular, when a terminal requests the stream from a formatted duplicating switch that is unable to support the request, the formatted duplicated switch interfaces with the stream manager to enable an unformatted duplicating switch to support the stream. The stream manager then interfaces with the terminal and transmits the identity of an unformatted duplicating switch that is capable of hosting the stream for the terminal.

Communications system 500 includes a stream source 510, a stream manager 520, a formatted duplicating switch 530, an unformatted duplicating switch 540, and a terminal 550. Generally, aspects of the stream source 510 correspond to aspects of stream sources 110 and 210 in FIGS. 1 and 2, aspects of the stream manager 520 correspond to aspects of stream manager 260 in FIG. 2, aspects of the formatted duplicating switch 530 correspond to aspects of the formatted duplicating switch 230 in FIG. 2, aspects of the unformatted duplicating switch 540 correspond to aspects of the unformatted duplicating switch 235 in FIG. 2, and aspects of the terminal 550 correspond to aspects of terminals 150 and 250 in FIGS. 1 and 2.

Initially, terminal 550 generates a request for the stream (step 551). The formatted duplicating switch receives the request (step 531) and determines the switch status (step 532). Determining the switch status may include determining the ability of the switch to support additional streams. For example, the formatted duplicating switch 530 may determine that supporting one additional stream will degrade the performance of hosting the streams for other terminals.

Based on a switch status that indicates another duplicating switch should support the stream, the formatted duplicating switch 530 requests redirection of the terminal 550 (step 533). Typically, requesting redirection of the terminal 550 includes generating a message to indicate that the formatted duplicating switch 530 will not support the terminal 550 and that another duplicating switch should support the terminal 550 instead.

Stream manager 520 receives the request to redirect the terminal 550 (step 521) and responds by identifying a duplicating switch (step 522) and directing enablement of the identified duplicating switch (step 523). The identified duplicating switch (unformatted duplicating switch 540) is enabled (step 541) and requests the stream (step 542).

Stream source 510 receives the request (step 511) and transmits the stream to unformatted duplicating switch 540 (step 512), which receives the stream (step 543). Independently of the unformatted duplicating switch 540 receiving the stream, stream manager 520 transmits the identity of the unformatted duplicating switch 540 to the terminal 550 as being a duplicating switch capable of providing the stream (step 524).

Terminal 550 receives the identity of the unformatted duplicating switch 540 (step 552) and requests the stream from that switch (step 553). Although in this instance the terminal 550 is requesting the stream, receiving the stream also may include having the terminal 550 request the stream from a device different from the device transmitting the stream. Another implementation may include having the terminal 550 receive the stream without a request being sent.

Unformatted duplicating switch 540 receives the request (step 544). In response, the unformatted duplicating switch 540 duplicates the stream (step 545) and transmits the stream to the terminal 550 (step 546), which then receives the stream (step 554).

Figure 6:
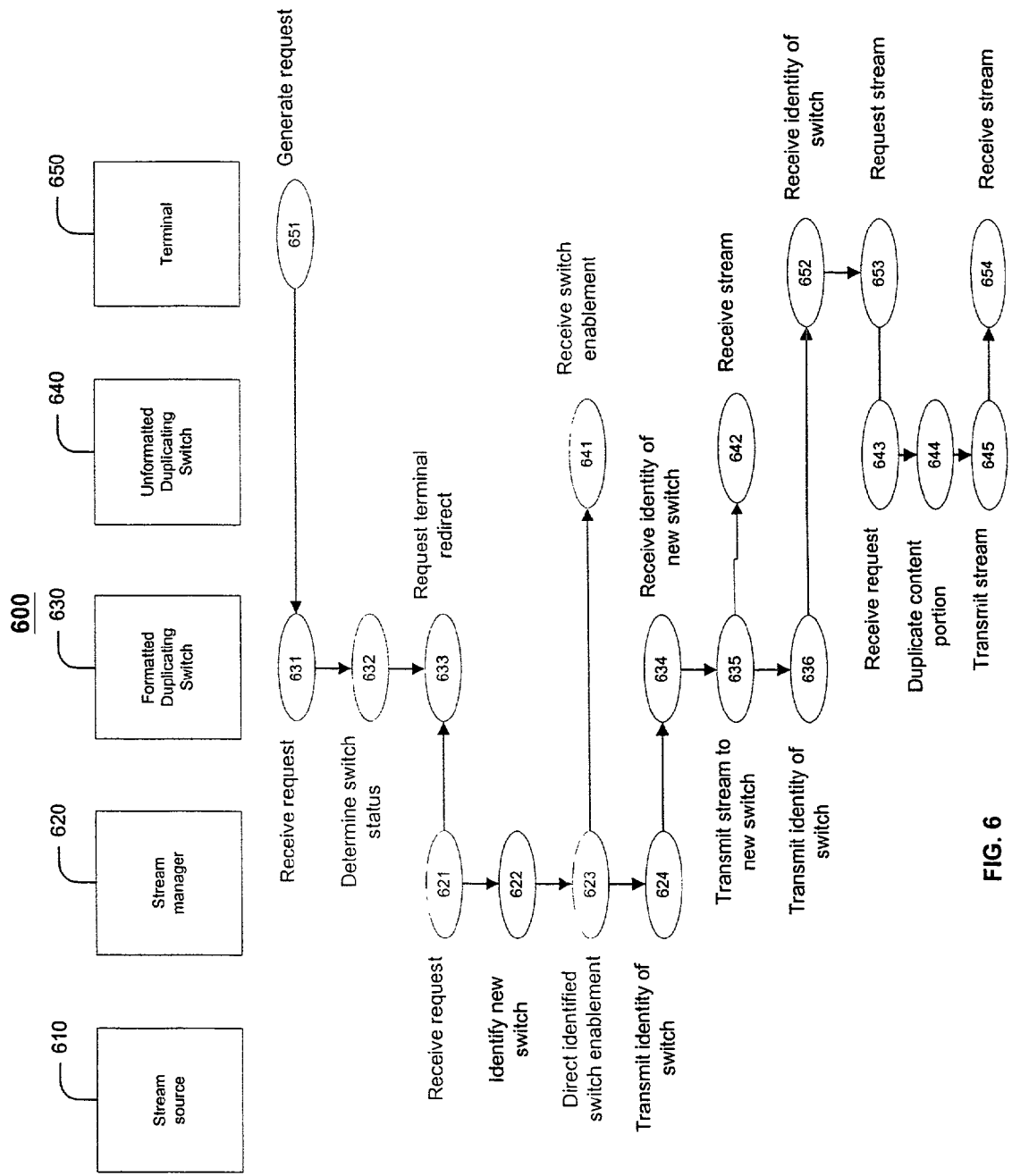
FIG. 6 is a flow diagram showing an unformatted duplicating switch interfacing with a formatted duplicating switch to transfer a terminal.

FIG. 6 illustrates having an unformatted duplicating switch interface with a formatted duplicating switch to transfer a terminal accessing the stream between duplicating switches. In particular, when a terminal interfaces with a formatted duplicating switch to receive the stream, and the formatted duplicating switch is unable to support the terminal, the formatted switch provides the identity of an unformatted switch capable of hosting the stream.

Communications system 600 includes a stream source 610, a stream manager 620, a formatted duplicating switch 630, an unformatted duplicating switch 640, and a terminal 650. Generally, aspects of the stream source 610 correspond to aspects of stream sources 110 and 210 in FIGS. 1 and 2, aspects of the stream manager 620 correspond to aspects of the stream manager 260 in FIG. 2, aspects of the formatted duplicating switch 630 correspond to aspects of the formatted duplicating switch 230 in FIG. 2, aspects of the unformatted duplicating switch 640 correspond to aspects of the unformatted duplicating switch 235 in FIG. 2, and aspects of the terminal 650 correspond to aspects of terminals 150 and 250 in FIGS. 1 and 2.

Initially, terminal 650 generates a request for the stream (step 651). Formatted duplicating switch 630 receives the request (step 631) and determines the switch status (step 632). Based on a switch status indicating that another duplicating switch should support the stream, the formatted duplicating switch 630 requests redirection of the terminal (step 633). Stream manager 620 receives the request (step 621), identifies a duplicating switch (step 622), and initiates enablement of the identified switch (step 623). The identified switch (i.e., unformatted duplicating switch 640) is enabled (step 641).

Stream manager 620 also transmits the identity of the identified switch (i.e., the identity of unformatted duplicating switch 640) to the formatted duplicating switch 630 (step 624). Formatted duplicating switch 630 receives the identity of the switch (step 634) and transmits the stream to the unformatted duplicating switch 640 (step 635).

Unformatted duplicating switch 640 receives the stream (step 642).

Formatted duplicating switch 630 also transmits the identity of the unformatted duplicating switch 640 to the terminal 650 (step 636). Terminal 650 receives the identity (step 652) and requests the stream from the unformatted duplicating switch 640 (step 653). Unformatted duplicating switch 640 receives the request (step 643), duplicates the stream (step 644), and transmits the stream to the terminal 650 (step 645), which receives the stream (step 654).

Figure 7:
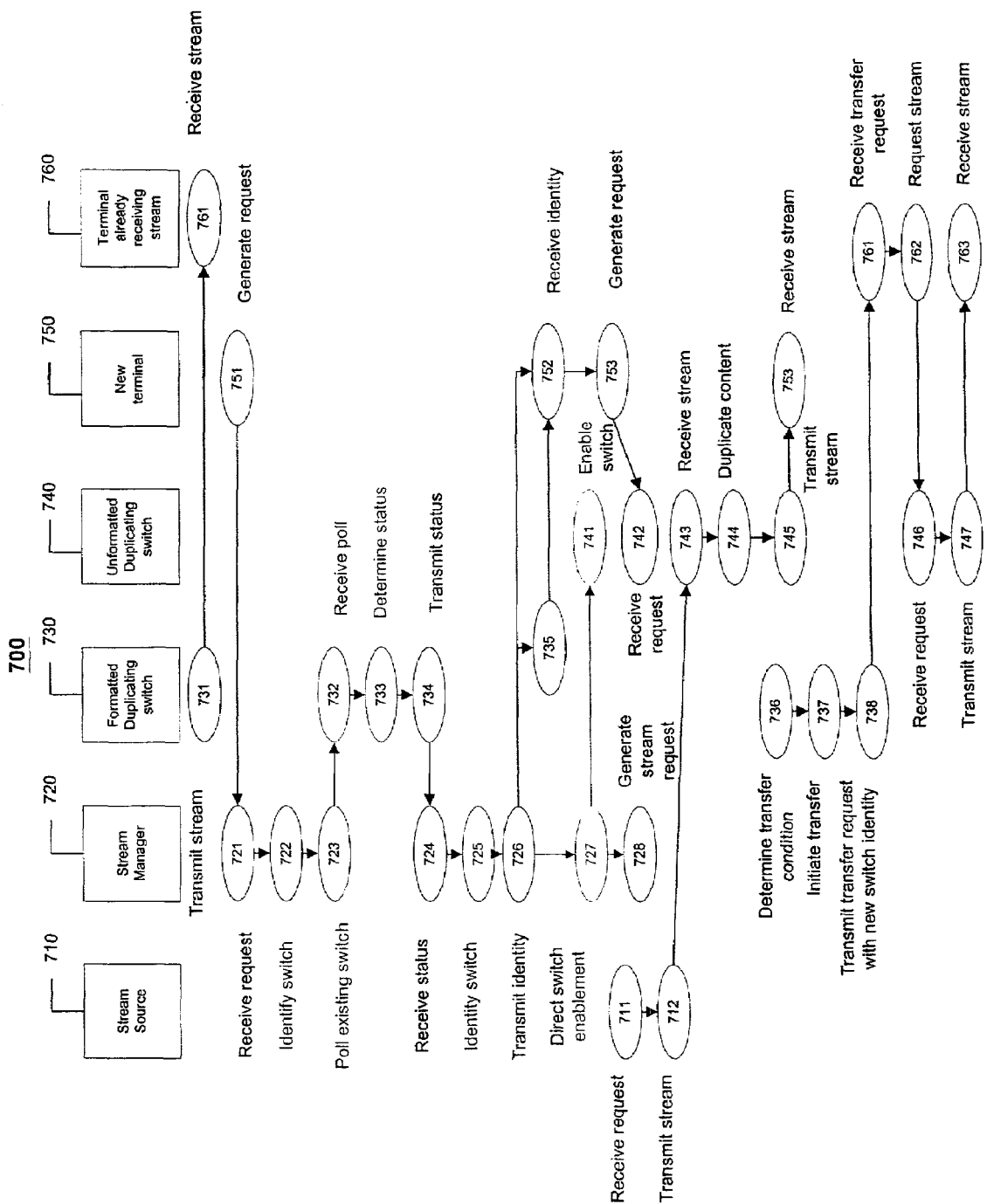
FIG. 7 is a flow diagram showing transfer to an unformatted duplicating switch of a terminal already receiving a stream.

FIG. 7 illustrates transitioning a terminal that is already receiving the stream from a formatted duplicating switch to an unformatted duplicating switch when the unformatted duplicating switch is enabled upon receiving a request from a new terminal. In particular, when a new terminal requests a stream from a formatted duplicating switch and receives the stream from an unformatted duplicating switch, a terminal already receiving the stream is transitioned to the unformatted duplicating switch.

Communications system 700 includes a stream source 710, a stream manager 720, a formatted duplicating switch 730, an unformatted duplicating switch 740, a new terminal 750, and a terminal already receiving the stream 760. Generally, aspects of the stream source 710 correspond to aspects of the stream sources 110 and 210 in FIGS. 1 and 2, aspects of the stream manager 720 correspond to aspects of the stream manager 260, in FIG. 2, aspects of the formatted duplicating switch 730 correspond to aspects of the formatted duplicating switch 230 in FIG. 2, aspects of the unformatted duplicating switch 740 correspond to aspects of the unformatted duplicating switch 235 in FIG. 2, and aspects of the terminals 750 and 760 correspond to aspects of the terminals 150 and 250, in FIGS. 1 and 2.

Prior to the new terminal 750 generating a request to receive a stream (step 751), the formatted duplicating switch 730 is transmitting the stream (step 73 1) and terminal 760 is receiving the stream (step 761). Terminal 760 may have requested the stream, or the stream may have been sent automatically.

When terminal 750 generates a request for the stream (step 751), stream manager 720 receives the request (step 721), identifies a duplicating switch (i.e., formatted duplicating switch 730) (step 722), and polls the formatted duplicating switch 730 (step 723).

Formatted duplicating switch 730 receives the poll (step 732) and determines its status (step 733). In this case, the status indicates that the formatted duplicating switch 730 should not host the stream for terminal 750. Formatted duplicating switch 730 transmits the status to the stream manager (step 734).

Determining the switch status may include quantifying a proposed connection between a terminal 750 and the formatted duplicating switch 730 into an estimated value. This estimated value may be compared against the estimated value for other duplicating switches to identify the duplicating switch to support the terminal 750.

Stream manager 720 receives the status (step 724). Because the status indicates that the switch should not host a stream for the new terminal 750, stream manager 720 again identifies a duplicating switch (step 725). This time, unformatted duplicating switch 740 is identified. The identity of unformatted duplicating switch 740 is then transmitted to the formatted duplicating switch 730 and the terminal 750 (step 726). Formatted duplicating switch 730 and new terminal 750 receive the identity of the new switch (steps 735 and 752).

The stream manager 720 also directs switch enablement for the unformatted duplicating switch 740 (step 727), which is then enabled (step 741). As part of enabling unformatted duplicating switch 740 to host access to the stream, stream manager 720 generates a stream request to the stream source 710 (step 728). The stream source 710 receives the request (step 711), and, in response, transmits the stream to unformatted duplicating switch 740 (step 712).

As the unformatted duplicating switch 740 is enabled, the terminal 750 generates a request for the stream upon receiving the identity of the unformatted duplicating switch 740 (step 753). The unformatted duplicating switch 740 receives the request (step 742) and begins duplicating the content and transmitting the stream to the new terminal 750, once the switch is enabled and the stream is received (steps 744 and 745). Terminal 750 receives the stream (step 753).

As part of enabling the unformatted duplicating switch 740, or in response to an independent condition, formatted duplicating switch 730 receives a transfer condition (step 736). Typically, receipt of a transfer condition indicates that a fault condition exists or is imminent.

For example, a duplicating switch may be scheduled for periodic maintenance to upgrade the software on the duplicating switch.

Receiving a transfer condition also may include determining that a new duplicating switch is better able to support the terminal based on criteria identified by the stream manager 720. For example, a stream manager may determine that a newly-available duplicating switch would consume less bandwidth.

In response to the transition condition, the formatted duplicating switch 730 initiates a transfer (step 737). The formatted duplicating switch 730 also transmits a transfer request to the terminal 760 already receiving the stream (step 738).

Terminal 760 receives the transition request (step 761) and requests the stream from the unformatted duplicating switch (step 762). Unformatted duplicating switch 740 receives the request (step 746) and transmits the stream to the terminal 760 (step 747), which then receives the stream (step 763).

Figure 8:
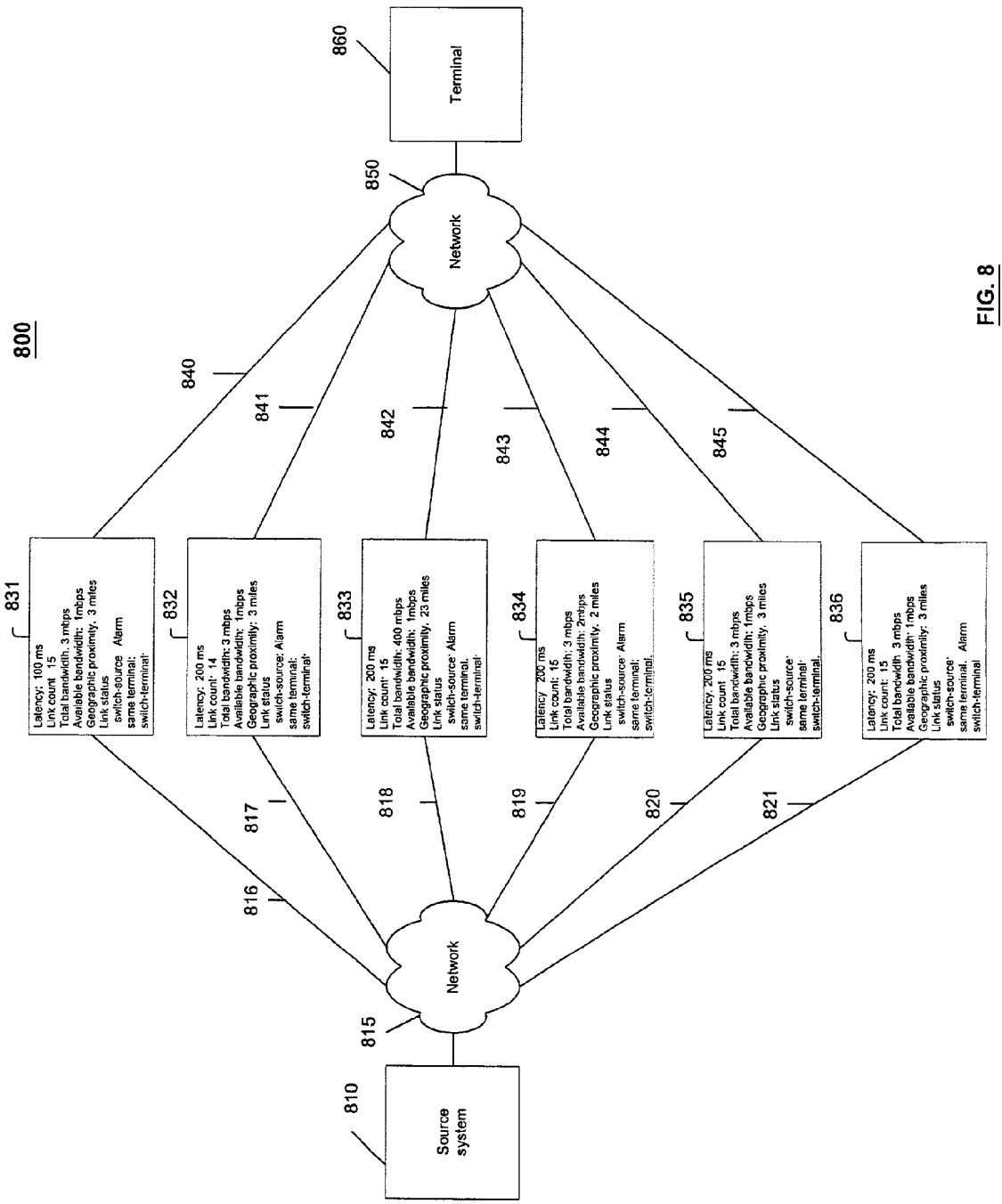
FIG. 8 is a block diagram showing how an unformatted duplicating switch may be identified based on prioritization.

FIG. 8 illustrates how a duplicating switch may be identified, depending upon the prioritization used, in a network of unformatted duplicating switches. In general, a stream manager will identify one of several duplicating switches, formatted or unformatted, based on the state of the network and the properties and conditions of the components and devices in the network. Communications system 800 includes a source system 810, a network 815, communications links 816-821, unformatted duplicating switches 831-836, communications links 840-845, a network 850, and a terminal 860. Generally, aspects of the stream source 810 correspond to aspects of stream sources 110 and 210 in FIGS. 1 and 2, aspects of networks 815 and 850 correspond to aspects of networks 120, 140, 220, and 240 in FIGS. 1 and 2, aspects of communications links 816-821 and 840-845 correspond to aspects of communications links 115 and 215 in FIGS. 1 and 2, aspects of the unformatted duplicating switches 831-836 correspond to aspects of the unformatted duplicating switch 235 in FIG. 2, and aspects of the terminal 860 correspond to aspects of terminals 150 and 250 in FIGS. 1 and 2.

Communications system 800 includes six duplicating switches with different properties. A duplicating switch may be identified to host a stream for a terminal based on the duplicating switch's properties and a prioritization system. For example, duplicating switch 831 has the lowest latency of 100 ms ("milliseconds") to the terminal 860. Thus, if latency between the duplicating switch and the terminal 860 is a determining criteria, switch 831 is identified. Latency may be measured between different nodes in the system. For example, latency may be measured between the stream source and the terminal, the duplicating switch and the terminal, the stream source and the duplicating switch, and between the above mentioned devices and a stream manager. The entire path, link, and/or route need not be measured. For example, the latency may be measured between the duplicating switch and an access point that consolidates the connections of several terminals.

Implementations also may include using proxies as reference points to determine latency. For example, the latency may be measured between a server commonly accessed by the terminal 860 and the duplicating switch.

To illustrate prioritization based on other criteria, duplicating switch 832 has the lowest link count to the terminal 860. Thus, duplicating switch 832 would be selected to host the stream when a link count is the determining criterion. Metrics analogous to the latency metrics described above (e.g., using proxies, and measuring the link count between the different devices in the system) also may be used.

Streaming may consume large amounts of network bandwidth relative to other applications. Thus, a stream manager may identify a switch with the most total bandwidth between the switch and the terminal 860. In this case, duplicating switch 833 would be selected. Similarly, a stream manager may select a duplicating switch that has the most available bandwidth between the terminal and a duplicating switch. Generally, available bandwidth describes the difference between the total bandwidth and the amount of bandwidth being used. In communications system 800, duplicating switch 834 has the most available bandwidth.

In cases where the path between devices may include links of different capabilities, techniques may quantify the path to create an aggregate value for a path, link, connection, or route. For example, the link with the smallest bandwidth may be a rate limiting connection. The bandwidth of the rate-limiting link may be used to quantify the overall path. In another implementation, factors such as the number of hops and the state of the link may impact the quantified value. For example, there may be a lower bandwidth link that implements stream prioritization so that the state of other links becomes the determining factor. The other links then may be used to calculate the bandwidth (total or available).

In some implementations, a stream manager may select a duplicating switch based on geographic proximity of the duplicating switch to the terminal. For example, a service provider may determine that geographic proximity best models a terminal's ability to receive a stream (e.g., represents the least data unit jitter or delay, or consumes the least bandwidth). In another example, a stream manager may have databases (e.g., billing records) populated with location information. This geographic information may enable a stream manager to identify the duplicating switch in closest geographic proximity to the terminal. In communications system 800, the duplicating switch 834 is in closest proximity (2 miles vs. 3 miles).

Other examples of determining proximity may include using a proxy to determine a location. For example, a zip code in a billing address may be approximated to describe a central point in that zip code. The proximity then may be measured between that central point and the duplicating switch. In another example, the location of a server that the terminal frequently accesses may be used as a proxy for the location of the terminal.

Identifying a duplicating switch may include using link status information. One example of link status information may include identifying unstable links. For example, if a link in a path or route has failed twice in the past hour, the stream manager may avoid referring terminals to duplicating switches that would use that link to communicate. In another example, some providers spend more to use third party links across their network. Thus, a stream manager may avoid directing terminals to a duplicating switch that would use the third party links.

The link status information may be based on one link in a path of several links, or the link status information may describe the end-to-end connection. The link status may include a switch-source link (e.g., communications links 816-821), a switch-terminal link (e.g., communications links 840-845), or a stream source-terminal link (e.g., communications links 816-821 and 840-845). Thus, if a source-terminal link is a determining criteria, switch 835 may be selected since each of the other duplicating switches has an alarm associated with its link status.

Implementations are not limited to negative prioritizations, that is avoiding certain links, paths, routes, and circuits. Implementations may include identifying a duplicating switch based on desirable link status information. For example, a stream manager may identify a duplicating switch with a guaranteed quality of service capability. In another example, a stream manager may identify a duplicating switch using a link with a prioritization capability.

Implementations may include a hierarchy of link states. For example, a stream manager may avoid selecting duplicating switches with failing alarm conditions (e.g., the links cannot host additional streams). A lesser alarm state may describe link states that are presently operational, but historically experience bandwidth constraints. A neutral link status may describe a link without any alarms, but without any performance enhancements. A link status may receive relative importance if the link offers prioritization for certain classes of traffic, and/or guaranteed performance (e.g., Resource Reservation Protocol).

Implementations may include using more than one criterion. For example, a stream manager may first identify all duplicating switches not experiencing alarm conditions, and then select from the identified duplicating switches a duplicating switch with the least delay.

Figure 9:
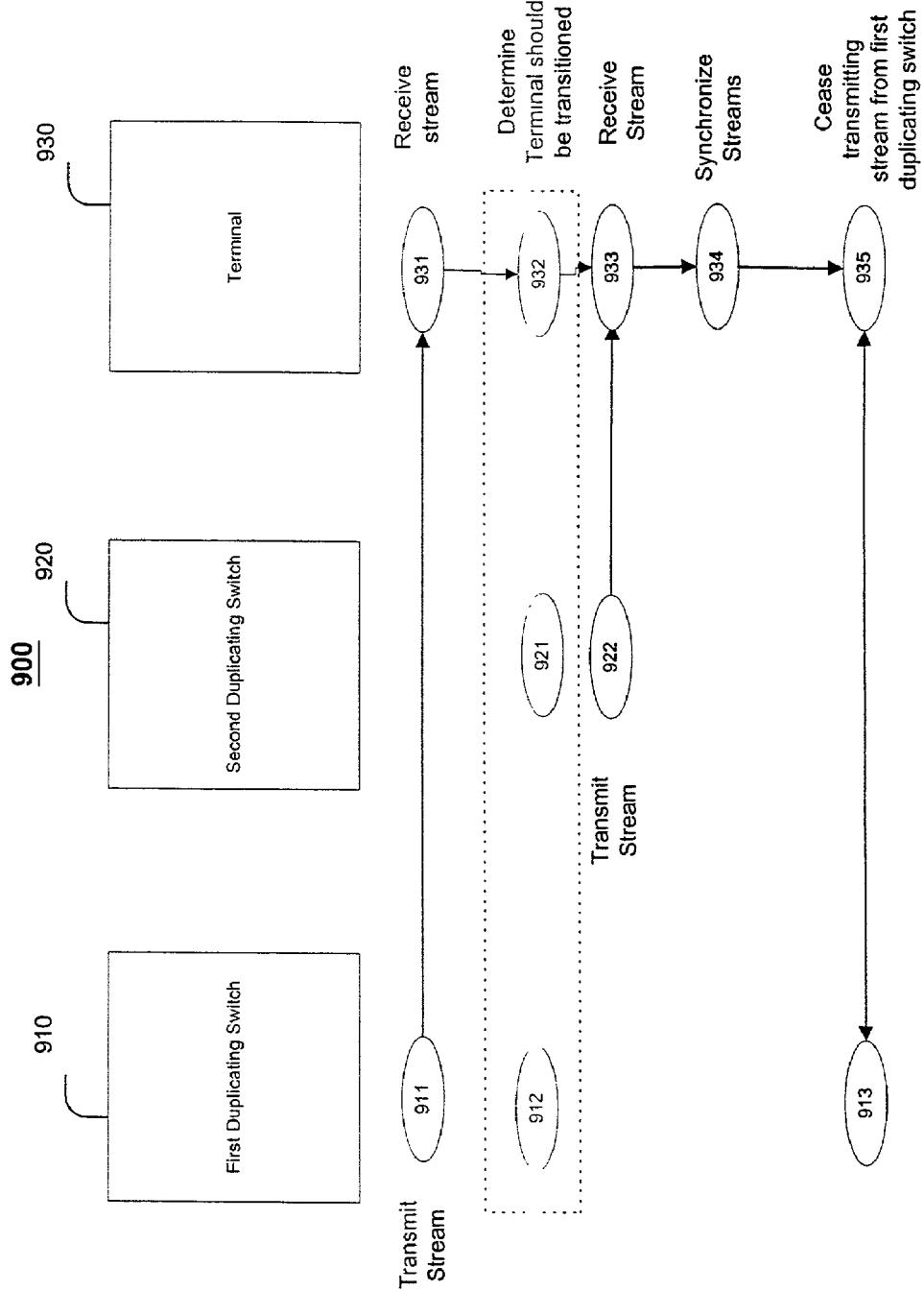
FIG. 9 is a flow diagram showing how a terminal may change sources.

FIG. 9 illustrates how a terminal may change sources between two duplicating switches. Communications system 900 includes a first duplicating switch 910, a second duplicating switch 920, and a terminal 930. Generally, aspects of the first duplicating switch 910 and the second duplicating switch 920 correspond to aspects of the formatted duplicating switch 230 in FIG. 2, and aspects of the terminal 930 correspond to aspects of terminals 150 and 250 in FIGS. 1 and 2.

Initially, the first duplicating switch 910 is transmitting a stream to terminal 930 (step 911). Terminal 930 receives the stream (step 931).

In response to a state change, it is determined that the terminal 930 should be transitioned from the first duplicating switch 910 to the second duplicating switch 920 (steps 912, 921, and 932) (e.g., a transfer condition in FIG. 7). The determination to transition may be made by the first duplicating switch 910, the second duplicating switch 920, a stream manager (not shown), or the terminal 930. Examples of the determination being made by a first duplicating switch 910 may include a determination that the first duplicating switch 910 is operating at maximum capacity. In another example, the first duplicating switch 910 also may receive an indication that the second duplicating switch 920 is newly enabled and can support streaming in a manner that consumes less bandwidth. Hosting the stream from the second duplicating switch 920 may consume less bandwidth because duplicated streams would not redundantly cross a wide area network.

Examples of the determination being made by the second duplicating switch 920 may include having the second duplicating switch 920 receive a list of terminals to support. A stream manager also may make such a determination. Another example may include receiving a message that the first duplicating switch 910 will experience an outage (e.g., will undergo maintenance, is running low on battery operated power, or is experiencing component failure).

Examples of the determination being made by the terminal 930 may include having the terminal 930 determine that the stream from the first duplicating switch 910 is experiencing transmission errors. The transmission errors may include dropped or delayed data units. Another example may include having the terminal 930 periodically poll a stream manager to determine if a "better" duplicating switch exists based on prioritized criteria (e.g., the criteria for identifying a duplicating switch in FIG. 8).

In any event, the determination of a transition condition is shared with at least the second duplicating switch 920, though it also may be shared with the first duplicating switch 910 and/or the terminal 930. Once an indication of the transition condition is received or determined on the second duplicating switch 920, the second duplicating switch 920 transmits the stream to the terminal 930 (step 922). Terminal 930 receives the stream from the second duplicating switch (step 933). At this point, terminal 930 receives streams from the first and second duplicating switches 910 and 920.

Terminal 930 synchronizes the two streams (step 934). Generally, synchronizing two streams indicates that related content components (e.g., the same frames) of the two streams are arriving within a required window such that the terminal could use content from either stream without the terminal experiencing an interruption. Examples of an interruption may include a loss of the signal or display, pixelization, and/or degradation of the sound channel or images.

Implementations of synchronizing may include having the terminal 930 request a particular data unit or frame that corresponds to the data unit that has been received or is expected. For example, if the second stream includes content that has already been displayed, the terminal 930 may request that the second duplicating switch 920 transmit content that begins with a specified sequence number corresponding to what is required at an expected arrival time in the future.

Once the streams are synchronized, the first duplicating switch 930 ceases to transmit the first stream (steps 913 and 935). In one implementation, transmission of the stream may be ceased in response to a message received by the terminal 930 that the streams are synchronized. In another implementation, transmission of the stream may be ceased upon the expiration of a time limit. For example, the first duplicating switch 910 may stop transmitting one minute after it is determined that a transition condition should occur. In another example, the first duplicating switch 910 may stop transmitting if no "keep alive" message is received in 30 seconds.

Figure 10:
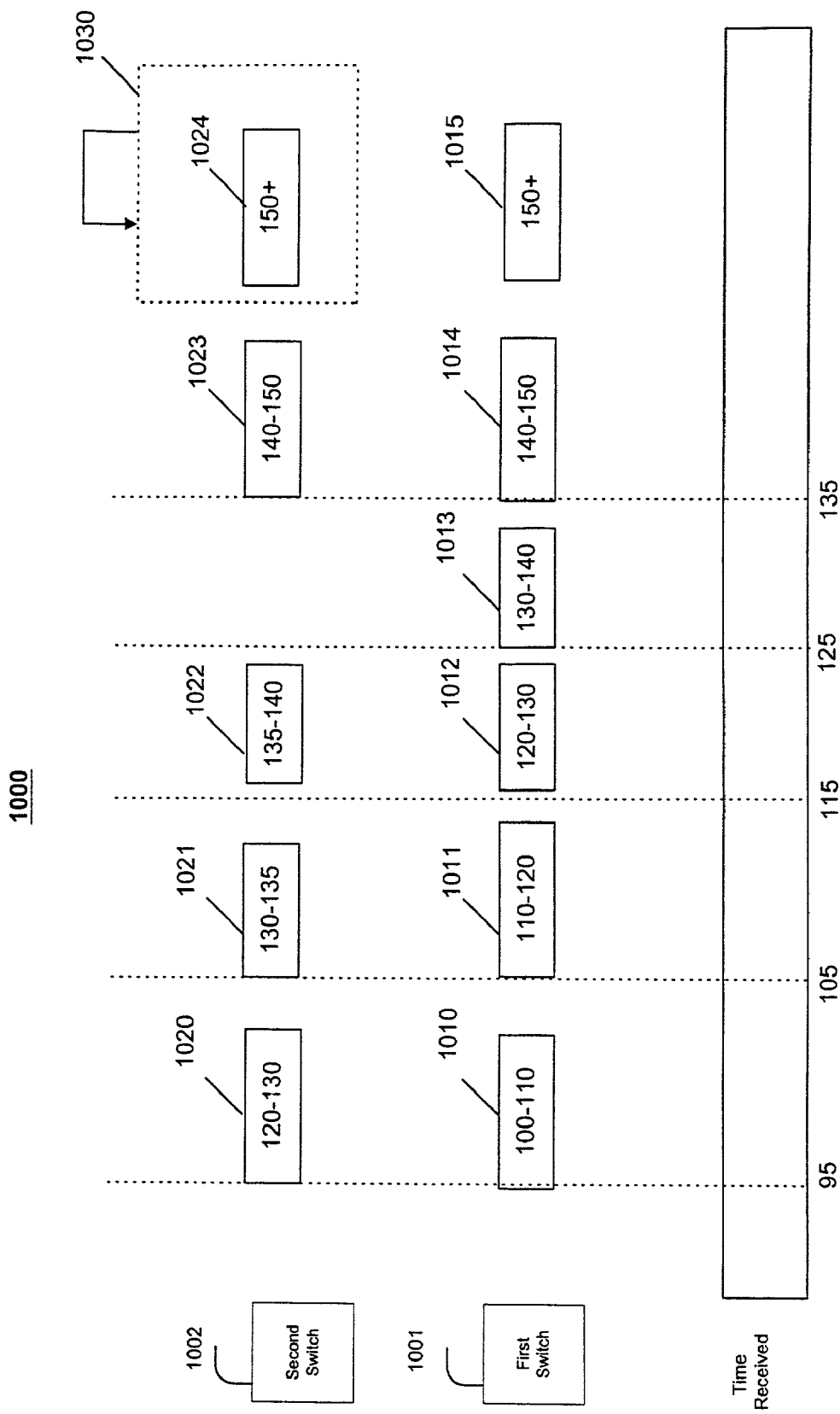
FIG. 10 is a timing diagram showing how a terminal may synchronize two streams transmitted by two duplicating switches.

FIG. 10 provides a timing chart 1000 that illustrates how a terminal that receives two streams may synchronize them. As shown, a first duplicating switch 1001 and a second duplicating switch 1002 receive a series of data units in a stream. The time-received bar at the bottom of FIG. 10 indicates when each data unit is received. The number inside the data unit indicates the corresponding time frame of the content appearing in the data unit.

Typically, when receiving a stream of data units, there is a window of when a data unit can be received relative to when the data unit is needed. For example, if the data unit is received too early, the terminal may not have enough buffer or memory to store the data unit until the content in the data unit is needed. If the data unit is received too late, there may be an interruption before the content is processed and displayed.

In FIG. 10, there is a five-unit window in which the data unit may be received. Data units 1010, 1011, 1012, 1013, and 1014 are part of a stream that the terminal is receiving and displaying. Because those data units arrive within the five-unit window, the content from the stream may be used in an uninterrupted fashion. For example, data unit 1010 with content beginning at time 100 arrives at time 95. Data units 1011, 1012, 1013, 1014, and 1015 similarly arrive within the five-unit (e.g., second) window.

The terminal is trying to synchronize the stream from the second duplicating switch 1002 in order to use the stream from the second duplicating switch 1002 instead of the stream from the first duplicating switch 1001. However, data units 1020, 1021, and 1022 all arrive outside of the five-second window. For example, data unit 1020 corresponds to content from time 120 to 140, but arrives twenty time units too early. Similarly, data unit 1021 also arrives 20 time-units too early. Data unit 1022 arrives fifteen time units too early, at time 115 for content beginning at 135.

Data unit 1023 is the first data unit that arrives within the acceptable five-unit window and that the terminal could accept from the second duplicating switch 1002. If the terminal had determined that subsequent data units would also arrive in the required window, the terminal could start using the stream from the second duplicating switch 1002. However, implementations may include requirements to receive multiple data units within the specified window in order to establish confidence that the second duplicating switch 1002 is capable of providing the data units as required without interruption. The requirement to validate more than one data unit is represented by the group 130 of data units 1024, which may include one or more data units that arrive after time 150.

Figure 11:
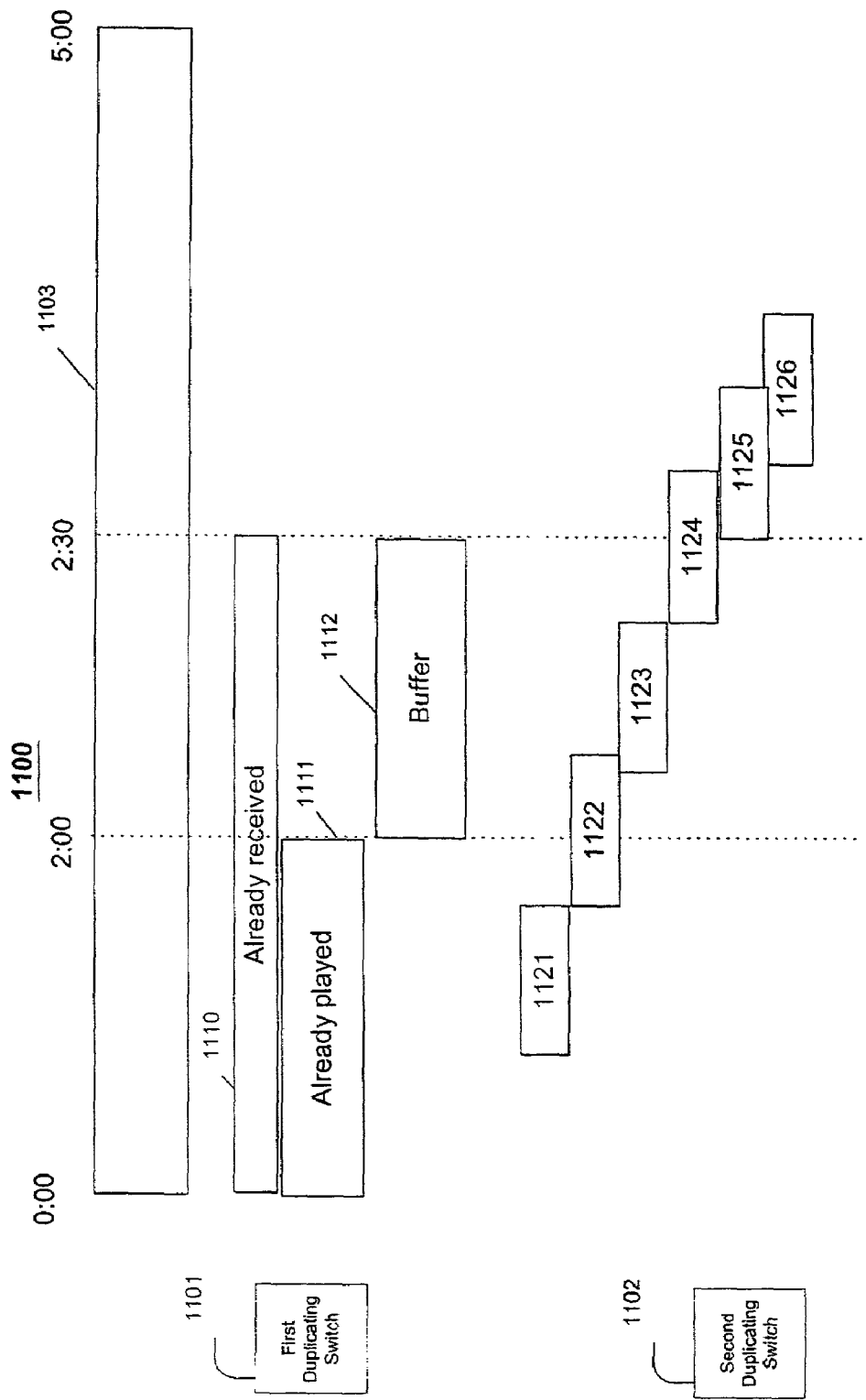
FIG. 11 is a timing diagram showing how a terminal may use a buffer to synchronize two streams transmitted by two duplicating switches.

FIG. 11 provides a timing diagram 1100 that illustrates how a buffer may be used to synchronize streams received by a terminal from two duplicating switches. As shown, first duplicating switch 1101 and a second duplicating switch 1102 are sending streams of data units corresponding to content represented by timeline 1103. The first duplicating switch 1101 has already sent content corresponding to content from time 0:00 to time 2:30. The terminal has already played content 1111 up to time 2:00. The content that the terminal has received that has not been played may be stored in a buffer 1112, corresponding to content from time 2:00 to time 2:30.

The second duplicating switch 1102 sends a stream of data units in an attempt to synchronize with content sent in the first stream, so that the terminal may seamlessly transition to using content from the second stream and cease using content from the first stream. The transition is seamless if the transition occurs without an interruption in the output of the content (e.g., the content that is required next is available and not transiting the network nor discarded).

In general, the transition is seamless when a portion of the content received in a second stream overlaps content in the buffer. For example, data unit 1121 would not provide a seamless transition because content from data unit 1121 does not overlap content in the buffer 1112. Data unit 1122 may provide a seamless transition because a portion of the content in data unit 1122 overlaps the buffer 1112. If the terminal is able to use the content that is received from the data unit 1122 that overlaps, a seamless transition may occur. However, terminal requirements may prevent the terminal from transitioning on data unit 1122. For example, the terminal may not have sufficient memory to receive data unit 1122 if the buffer is already full. In another example, frame-to-frame encoding issues may prevent the terminal from being able to synchronize if the frame-to-frame differences reference a frame that is no longer available.

As described above, implementations may require several data units of a stream to be received before the confidence to transition can be established. However, the terminal in communications system 1100 presumes that once a data unit arrives with content that overlaps content in the buffer, subsequently received data units will arrive in a timely manner.

The content in data unit 1123 overlaps the content in the buffer 1112. Thus, data unit 1123 may be used to synchronize. Similarly, data unit 1124 includes content corresponding to the end of the content in the buffer and beyond. Unless terminal limitations (e.g., available memory) prevent the data unit 1124 from being received, the data unit 1124 is a data unit that may be used to synchronize without interruption. Similarly, since content from data unit 1125 begins when the content from the buffer 1112 ends, data unit 1125 may be used to synchronize, absent terminal limitations.

However, data unit 1126 may not be used to synchronize since there is a content gap between the end of the buffer 1112 and the beginning of the content in data unit 1126. Unless additional data units with content are provided to bridge the gap, the terminal will experience an interruption and/or be unable to synchronize. Implementations may enable a terminal to receive data units with content to bridge the gap, either from duplicating switch 1101 or duplicating switch 1102, in order for the terminal to synchronize around data unit 1126. Implementation also may synchronize around data unit 1126, allowing for some interruption. For example, a terminal may decide that data unit 1126 is close enough to synchronize on, and synchronize, notwithstanding the interruption. Depending on the nature and/or format of the content, the interruption may be minor or even unperceivable. Other interruptions might be more substantial.

Other implementations are within the scope of the following claims. For instance, a stream manager may request transmission of the stream to the terminals. The stream manager may include a network operator, a managing server, a workstation, or a scheduling agent.

In some cases, a terminal does not transition upon the state change creating a transfer condition. For example, the terminal may be limited to a specified frequency for transitioning. Other limitations may include waiting until a certain number of terminals experience the condition. Other transitioning thresholds may exist to limit the resources consumed in transitioning.

What is claimed is:

1. A method of changing a stream source accessed by a first terminal, the method comprising:
   enabling the first terminal to access a first stream of data units having a content from a first duplicating switch that is formatted to enable terminals to access the content by establishing a session with the first duplicating switch;
   transmitting, using the first duplicating switch, the first stream of data units to the first terminal;
   receiving, from a second terminal that is not presently receiving the content of the first stream of data units, a request to access the content of the first stream of data units;
   identifying, based the received request, a second duplicating switch from a group of duplicating switches that includes the first duplicating switch and the second duplicating switch;
   instructing, based on a determination that the second duplicating switch is not presently hosting the content of the first stream of data units, the second duplicating switch to access the content of the first stream of data units;
   instructing, based on a determination that the second duplicating switch is not presently hosting the content of the first stream of data units, the second duplicating switch to host the content of the first stream of data units;
   enabling the second duplicating switch to host the content of the first stream of data units by:
      transmitting a copy of the content of the first stream of data units to the second duplicating switch; and
      instructing the second duplicating switch to store at least a portion of the copy of the content of the first stream of data units;
   enabling the second terminal to access a second stream of data units including the stored copy of the content from the second duplicating switch by establishing a session with the second duplicating switch;
   receiving, based on instructing the second duplicating switch to host the content of the first stream of data units, an indication of a transfer condition;
   determining, based on receiving the indication of the transfer condition, that the first terminal should access the content of the first stream of data units from the second duplicating switch;
   enabling the first terminal to access a third stream of data units including the stored copy of the content from the second duplicating switch;
   providing the first terminal with an address of the second duplicating switch; and
   instructing the first terminal to transfer from using the first duplicating switch to using the second duplicating switch in order to access the third stream of data units using the address of the second duplicating switch.

2. The method of claim 1 further comprising causing the second duplicating switch to transmit the third stream upon determining that the first terminal should access the third stream from the second duplicating switch.

3. The method of claim 1 wherein determining that the first terminal should access the third stream from the second duplicating switch includes determining that enabling the first terminal to access the second duplicating switch will consume less bandwidth than having the first terminal access the first duplicating switch.

4. The method of claim 1 further comprising disabling the first terminal from accessing the first stream of data units from the first duplicating switch.

5. A method of changing a source accessed by a first terminal from a first instance of a stream of data units receiving from a first duplicating switch to a second instance of the stream of data units receiving from a second duplicating switch, the method comprising:
   using a first terminal to receive the first instance of the stream of data units having a content from the first duplicating switch;
   receiving a request from a second terminal to access the content of the first instance of the stream of data units, wherein the second terminal is not presently receiving the content of the first instance of the stream of data units;
   identifying, based on the received request, the second duplicating switch from a group of duplicating switches that includes the first duplicating switch and the second duplicating switch;
   instructing, based on a determination that the second duplicating switch is not presently hosting the content of the first instance of the stream of data units, the second duplicating switch to access the content of the first instance of the stream of data units;

instructing, based on a determination that the second duplicating switch is not presently hosting the content of the first instance of the stream of data units, the second duplicating switch to host the content of the first instance of the stream of data units;

enabling the second duplicating switch to host the content of the first instance of the stream of data units by:
transmitting a copy of the content of the first instance of the stream of data units to the second duplicating switch; and
instructing the second duplicating switch to store at least a portion of the copy of the content of the first instance of the stream of data units;

receiving, based on instructing the second duplicating switch to host the content of the first instance of the stream of data units, an indication of a transfer condition;

determining, based on receiving the indication of the transfer condition, that the first terminal should access the second instance of the stream of data units having the content of the first instance of the stream of data units from the second duplicating switch;

instructing the second duplicating switch to support connection requests for the second instance of the stream of data units;

providing the first terminal with an address of the second duplicating switch;

instructing the first terminal to transfer from using the first duplicating switch to receive the first instance to using the second duplicating switch in order to access the second instance of the stream of data units using the address of the second duplicating switch;

transitioning to the second instance of the stream of data units in response to the determination; and synchronizing presentation of the first and second instances of the stream of data units.

6. The method of claim 5 further comprising ceasing reception of the first stream from the first duplicating switch.

7. The method of claim 6 wherein the reception is ceased in response to receiving a cease message.

8. The method of claim 5 wherein receiving the indication of the transfer condition includes determining that transitioning the first terminal to the second duplicating switch would consume less bandwidth.

9. The method of claim 5 wherein receiving the indication of the transfer condition includes determining that transitioning the first terminal to the second duplicating switch would decrease resources required by the first terminal.

10. The method of claim 5 wherein receiving the indication of the transfer condition includes determining that a network between the first terminal and the second duplicating switch has more bandwidth.

11. The method of claim 5 wherein receiving the indication of the transfer condition includes determining that a network between the first terminal and the second duplicating switch has more available bandwidth.

12. The method of claim 5 wherein receiving the indication of the transfer condition includes determining that a network between the first terminal and the second duplicating switch has less latency.

13. The method of claim 5 wherein receiving the indication of the transfer condition includes determining that a network between the first terminal and the second duplicating switch has better quality of service characteristics.

14. The method of claim 5 wherein receiving the indication of the transfer condition includes determining that a network between the first terminal and the second duplicating switch has better time variation characteristics.

15. The method of claim 5 wherein synchronizing the first and second instances includes determining that content received in the first instance is temporally related to content received in the second instance.

16. The method of claim 15 wherein the content is identical.

17. The method of claim 15 wherein the content of the first instance and the second instance is temporally related such that the first terminal may use the second instance in place of the first instance without a user of the terminal perceiving the transition.

18. The method of claim 5 wherein synchronizing the first and second instances includes using a buffer.

19. The method of claim 5 wherein using the buffer includes determining that content exists in the buffer such that the first terminal may transition from using the first instance to using the second instance without a user of the first terminal perceiving the transition.

20. The method of claim 5 further comprising ceasing reception of the first instance when it is determined that content in the buffer temporally overlaps content in the second instance.

21. The method of claim 5 wherein content in the buffer is provided by the first instance.

22. The method of claim 5 wherein content in the buffer is provided by the second instance.

23. A stream manager comprising:
first processing means structured and arranged to:
enable the first terminal to access a first stream of data units having a content from a first duplicating switch that is formatted to enable terminals to access the content by establishing a session with the first duplicating switch;
second processing means structured and arranged to:
receive a request from a second terminal to access the content of the first stream of data units, wherein the second terminal is not presently receiving the content of the first stream of data units;
identify, based on the received request, a second duplicating switch from a group of duplicating switches that includes the first duplicating switch and the second duplicating switch;
instruct, based on a determination that the second duplicating switch is not presently hosting the content of the first stream of data units, the second duplicating switch to access the content of the first stream of data units;
instruct, based on a determination that the second duplicating switch is not presently hosting the content of the first stream of data units, the second duplicating switch to host the content of the first stream of data units requested by the second terminal by:
instructing a transmission of a copy of the content of the first stream of data units to the second duplicating switch; and
instructing the second duplicating switch to store at least a portion of the copy of the content of the first stream of data units; third processing means structured and arranged to:

receive, based on instructing the second duplicating switch to host the content of the first stream of data units, an indication of a transfer condition;

determine, based on receiving the indication of the transfer condition, that the first terminal should access the content of the first stream of data units from the second duplicating switch;

enable the first terminal to access the stored copy of the content of the first stream of data units from the second duplicating switch;

provide the first terminal with an address of the second duplicating switch; and instruct the first terminal to transfer from using the first duplicating switch to using the second duplicating switch in order to access the content of the first stream of data units using the address of the second duplicating switch.

* * * * *